May 16, 1939.  J. T. ASHCRAFT  2,158,814
FISHING TOOL FOR DRILL STEMS
Filed Jan. 24, 1938   2 Sheets-Sheet 2
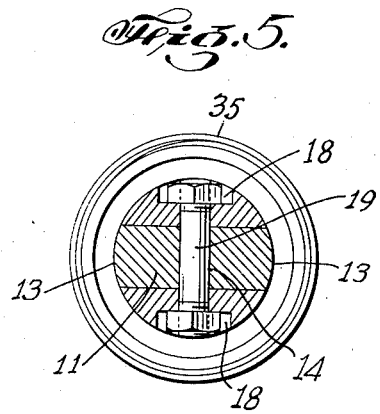
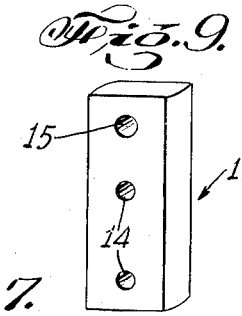
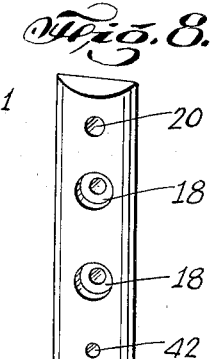
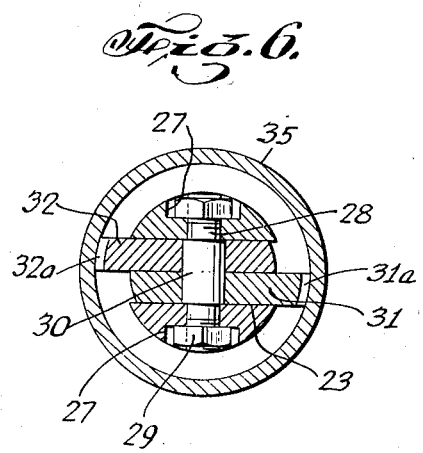
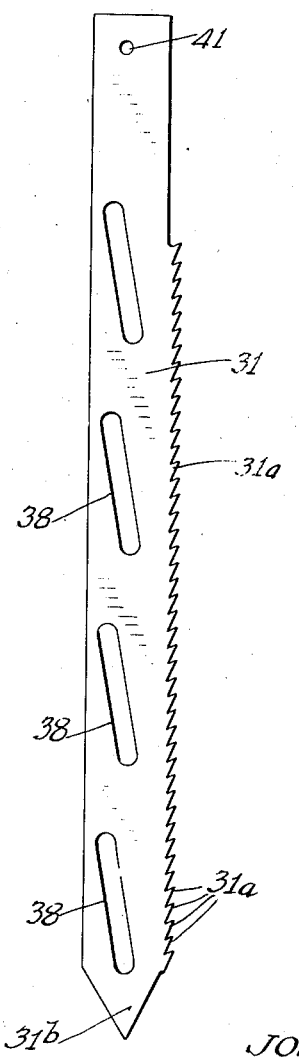
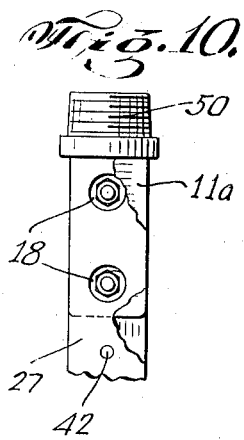
INVENTOR
JOHN T. ASHCRAFT
BY Carl Miller
ATTORNEY Patented May 16, 1939

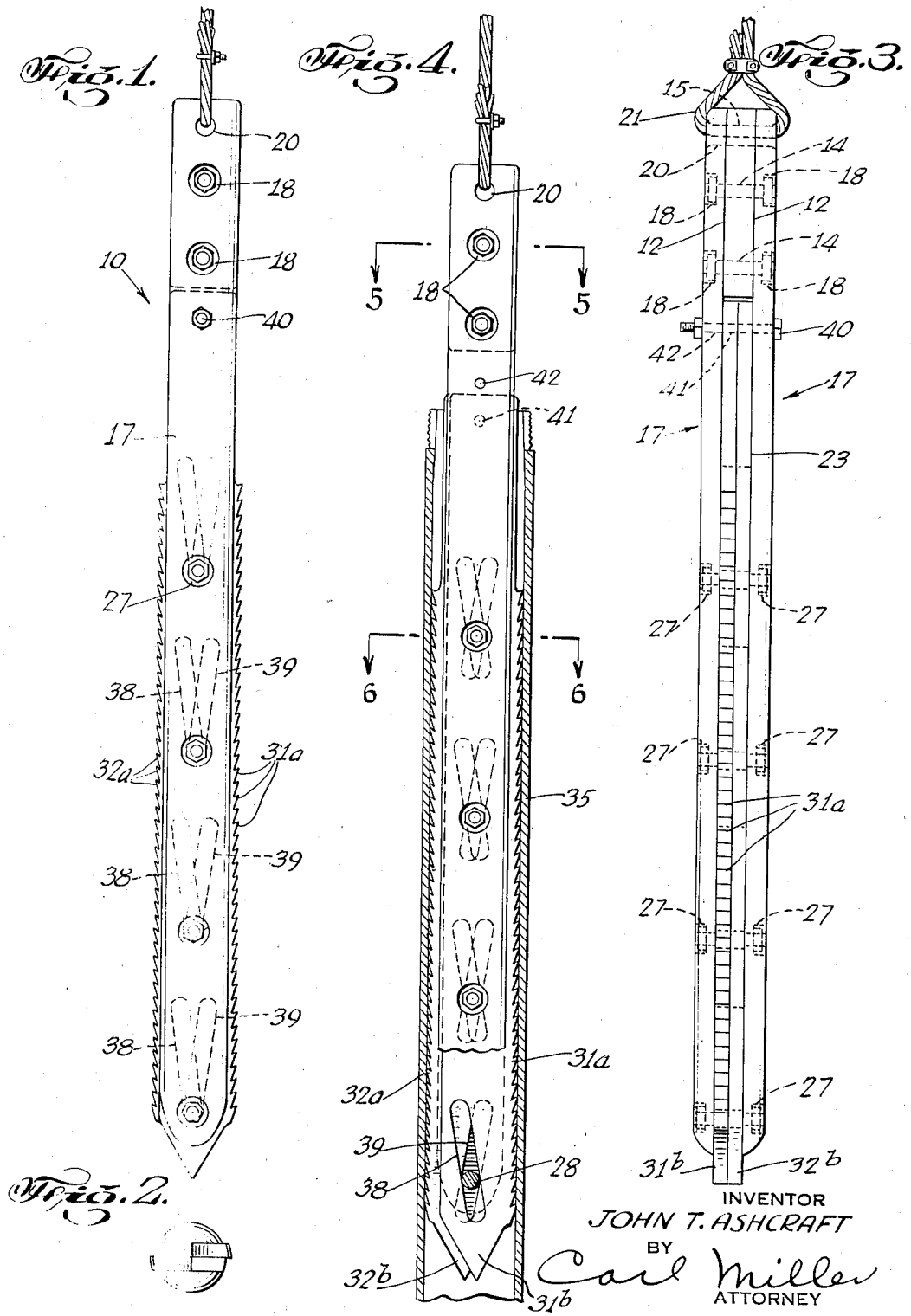

2,158,814

UNITED STATES PATENT OFFICE 2,158,814

FISHING TOOL FOR DRILL STEMS

John T. Ashcraft, Sheridan, Ark.

Application January 24, 1938, Serial No. 186,659

5 Claims. (Cl. 294—94)

This invention relates to fishing tools for drill stems, pipes and the like tubular articles.

An object of this invention is to provide a tool of the character described which may easily be inserted into a drill stem broken while being used for drilling oil wells, and which will grip the drill stem when lifting upwardly on the tool; the construction being such that the grip will be increased as resistance is offered to the lifting of the drill stem.

Another object of this invention is to provide a strong, rugged and durable fishing tool of the character described, which shall be relatively inexpensive to manufacture, easy to manipulate, and practical and efficient to a high dgree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention;

Fig. 1 is a front elevational view of a fishing tool embodying the invention before use;

Fig. 2 is a bottom end view of my improved fishing tool;

Fig. 3 is a side elevational view of the structure shown in Fig. 1;

Fig. 4 is a front elevational view of my improved fishing tool inserted within the upper end of a drill stem, and illustrating the method of using the tool;

Fig. 5 is a cross-sectional view taken on line 5—5 of Fig. 4;

Fig. 6 is a cross-sectional view taken on line 6—6 of Fig. 4;

Fig. 7 is a front elevational view of one of the gripping dogs;

Fig. 8 is a perspective view of one of the guide plates;

Fig. 9 is a perspective view of the spacer or draw bar; and

Fig. 10 is a partial front elevational view of the upper end of a fishing tool embodying the invention, and illustrating a modified form thereof.

Referring now in detail to the drawings, 10 designates a fishing tool embodying the invention, for retrieving drill stems broken while drilling oil wells or other tubular members. The fishing tool 10 comprises a draw bar or spacer member 11. The member 11 has a pair of opposite parallel flat faces 12, and the side edges 13 of the bar are part-cylindrical in shape. Said bar 11 is formed with a pair of transverse parallel bolt openings 14, and with a transverse opening 15 adjacent the upper end thereof, for the purpose hereinafter appearing.

Attached to the opposite side faces 12 of the bar 11 are a pair of similar, symmetrically disposed guide plates or members 17 having counter-sunk bolt openings 18 aligned with the bolt openings 14 for receiving bolts 19 passing through said openings. The outer surfaces of the member 17 are likewise part-cylindrical in shape. The guide members 17 are furthermore formed with openings 20 aligned with the opening 15 in the bar 11 to provide a through opening for receiving a cable 21 on which the tool 10 is suspended.

The guide plates or members 17 are considerably longer than the bar 11 and form therebetween a slot 23 disposed below the bar 11. The upper end of the tool is cylindrical in cross section as seen in Fig. 5 of the drawings. Each of the members 17 is formed with a plurality of spaced counter-sunk openings 27. Said members 17 are interconnected by bolts 28 traversing slot 23 and having nuts or heads 29 disposed within the counter-sunk openings. The central portions 30 of the bolts 28 are of somewhat increased diameter and disposed within the slot 23, and hold the bottom ends of said members 17 apart.

Disposed within the slot 23 and between the guide members 17 and below bar 11, are a pair of similar elongated gripping dogs or plates or bars 31 and 32 disposed in opposed relation. The dogs 31 and 32 have face to face contact. One has a toothed edge 31a on one side of slot 23, and the other has a toothed edge at the opposite side of said slot.

The teeth 31a, 32a point upwardly so that when the tool is inserted within a drill stem 35, or other pipe, the tool will readily move downwardly, but will grip the inner surface of the drill stem or pipe when the tool is lifted after insertion, as will be more clearly explained hereinafter.

The bottom ends of the dogs 31, 32 are preferably pointed as shown at 31b and 32b, and extend below said guide plates. The plate 31 is formed with a plurality of similar slots 38 disposed one above the other, and all inclined in the same direction. The slots 38 are spaced apart between centers, similarly to the bolts 28, and the central portions 30 of said bolts pass through said slots. The other dog 32 is likewise formed with a plurality of similar equally spaced inclined slots 39, crossing the slots 38 and likewise receiving the bolt portions 30 therethrough.

It will now be understood that the dogs 31, 32 may move up and down on the bolts 28, and due to the inclined slots will be caused to move sideways as they move up or down. The dogs may be held against movement relative to the guide plates 17, by means of a bolt 40 passing through aligned openings 41 in the dogs, and openings 42 in the plate 17. When the bolt 40 is removed, the dogs 31, 32 will tend to drop, and the toothed edges 31a and 32a will spread apart. The tool may be lowered with the cable 21, and when the points 31b and 32b are inserted into the upper end of a drill stem, the dogs will move upwardly on the bolts 28, and the tool will not grip the interior of the drill stem. However upon lifting, the tool will grip the inner surface of the drill stem 35 and the engagement of the dogs will increase as resistance is offered to the lifting movement.

As shown in Fig. 10, the draw or spacer bar 11a may have a screw-threaded head 50 adapted to engage the threaded end of a drill stem, whereby the fishing tool may be lowered by a drill stem instead of a cable.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Leters Patent:

1. A fishing tool of the character described comprising a spacer bar, a pair of guide members fixed to opposite sides of said spacer bar and extending therebelow, a plurality of bolts interconnecting said members below the bar and traversing the slot formed between said members, and a pair of dogs disposed within said slot and between said members, one dog having a plurality of inclined slots receiving said bolts therethrough, and the other dog having a plurality of slots inclined in an opposite direction and receiving said bolts therethrough, one longitudinal edge of one dog being formed with teeth, and an opposite edge of the other dog being formed with teeth.

2. A fishing tool of the character described comprising a spacer bar, a pair of guide members fixed to opposite sides of said spacer bar and extending therebelow, a plurality of bolts interconnecting said members below the bar and traversing the slot formed between said members, and a pair of dogs disposed within said slot and between said members, one dog having a plurality of inclined slots receiving said bolts therethrough, and the other dog having a plurality of slots inclined in an opposite direction and receiving said bolts therethrough, and means for retaining said dogs against movement relative to said members.

3. A fishing tool comprising a spacing bar, a pair of guide members receiving said spacing bar therebetween adjacent the upper ends thereof, means for fixing said members to said spacing bar, a plurality of bolts interconnecting the portions of the guide members disposed below the spacing bar, and traversing the slot formed between said portions, and a pair of elongated plates disposed within said slot and having contacting faces, one of said plates having a plurality of similar slots inclined in one direction and receiving said bolts therethrough, the other said plates having a plurality of similar slots inclined in the opposite direction and receiving said bolts therethrough.

4. A fishing tool comprising a spacing bar, a pair of guide members receiving said spacing bar therebetween adjacent the upper ends thereof, means for fixing said members to said spacing bar, a plurality of bolts interconnecting the portions of the guide members disposed below the spacing bar, and traversing the slot formed between said portions, and a pair of elongated plates disposed within said slot and having contacting faces, one of said plates having a plurality of slots inclined in one direction and receiving said bolts therethrough, the other said plates having a plurality of slots inclined in the opposite direction and receiving said bolts therethrough, one longitudinal edge of one of said plates being formed with upwardly projecting teeth, and the other longitudinal edge of said other plate being formed with upwardly projecting teeth.

5. A fishing tool comprising a spacing bar, a pair of guide members receiving said spacing bar therebetween adjacent the upper ends thereof, means for fixing said members to said spacing bar, a plurality of bolts interconnecting the portions of the guide members disposed below the spacing bar, and traversing the slot formed between said portions, and a pair of elongated plates disposed within said slot and having contacting faces, one of said plates having a plurality of slots inclined in one direction and receiving said bolts therethrough, the other said plates having a plurality of slots inclined in the opposite direction and receiving said bolts therethrough, one longitudinal edge of one of said plates being formed with upwardly projecting teeth, and the other longitudinal edge of said other plate being formed with upwardly projecting teeth, said plates having pointed bottom ends projecting below said guide members.

JOHN T. ASHCRAFT.